(12) United States Patent
Lee

(10) Patent No.: US 8,707,175 B2
(45) Date of Patent: Apr. 22, 2014

(54) MOBILE TERMINAL AND CONTROL METHOD THEREOF

(75) Inventor: Sang-Min Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 510 days.

(21) Appl. No.: 12/729,132

(22) Filed: Mar. 22, 2010

(65) Prior Publication Data
US 2010/0269040 A1 Oct. 21, 2010

(30) Foreign Application Priority Data
Apr. 16, 2009 (KR) .................. 10-2009-0033341

(51) Int. Cl.
*G06F 3/01* (2006.01)

(52) U.S. Cl.
USPC .......................................... 715/702

(58) Field of Classification Search
USPC ......... 715/741–743, 769–770, 772–773, 814, 715/863–867; 726/16–19, 21, 27–28, 30
See application file for complete search history.

(56) References Cited

U.S. PATENT DOCUMENTS

| | | | | |
|---|---|---|---|---|
| 5,907,327 A | * | 5/1999 | Ogura et al. .................. | 715/764 |
| 7,231,231 B2 | * | 6/2007 | Kokko et al. .................. | 455/566 |
| 7,395,506 B2 | * | 7/2008 | Tan et al. ...................... | 715/741 |
| 7,593,000 B1 | * | 9/2009 | Chin .............................. | 345/156 |
| 2004/0034801 A1 | * | 2/2004 | Jaeger ........................... | 713/202 |
| 2005/0253817 A1 | * | 11/2005 | Rytivaara et al. ............. | 345/173 |
| 2007/0016958 A1 | * | 1/2007 | Bodepudi et al. ............... | 726/27 |
| 2007/0150826 A1 | * | 6/2007 | Anzures et al. ............... | 715/772 |
| 2008/0036743 A1 | * | 2/2008 | Westerman et al. .......... | 345/173 |
| 2008/0122796 A1 | * | 5/2008 | Jobs et al. ...................... | 345/173 |
| 2009/0006991 A1 | * | 1/2009 | Lindberg et al. .............. | 715/763 |
| 2009/0122018 A1 | * | 5/2009 | Vymenets et al. ............. | 345/173 |
| 2009/0140064 A1 | * | 6/2009 | Schultz et al. .................. | 236/51 |
| 2010/0001967 A1 | * | 1/2010 | Yoo ................................ | 345/173 |
| 2010/0257490 A1 | * | 10/2010 | Lyon et al. ..................... | 715/863 |

* cited by examiner

*Primary Examiner* — Enrique Iturralde
(74) *Attorney, Agent, or Firm* — Lee, Hong, Degerman, Kang & Waimey (57) ABSTRACT

A method of controlling a mobile terminal is presented. The method includes detecting a first touch on the mobile terminal for a predetermined time when the mobile terminal is in a locked state, simultaneously displaying a locking icon and an unlocking icon in response to the detected first touch, and detecting a second touch on the locking icon or the unlocking icon, wherein touching the locking icon for a predetermined time will partially unlock the mobile terminal, and wherein touching and dragging the unlocking icon to the locking icon will fully unlock the mobile terminal.

22 Claims, 9 Drawing Sheets

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0033341, filed on Apr. 16, 2009, the contents of which is incorporated by reference herein in its entirety.

FIELD OF THE INVENTION

The present invention relates to a mobile terminal capable of releasing a locked state in response to user interaction.

DESCRIPTION OF THE RELATED ART

Terminals may be categorized as mobile terminals and stationary terminals according to their mobility. Additionally, the mobile terminals may be further categorized as a handheld terminal or a vehicle mount terminal according to whether the mobile terminal is portable.

The mobile terminal may implement various features such as capturing still or moving images, playing music or video files, providing games, and receiving a broadcast. Various attempts have been made to implement the multimedia functionality via hardware or software.

Recently, mobile terminals comprising a touch screen have become prevalent in the market. Moreover, touch screens are increasing in size to accommodate various needs. Accordingly, as a result of the increased size, a user may make an unexpected touch while carrying or using the mobile terminal. For example, a specific functional icon may be inadvertently touched by a user and a function corresponding to the icon may be unintentionally executed as a result of the inadvertent touch. Therefore, there is a need to determine whether a touch is intended by a user prior to executing a function associated with an icon.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method of controlling a mobile terminal is presented. The method includes detecting a first touch on the mobile terminal for a predetermined time when the mobile terminal is in a locked state, simultaneously displaying a locking icon and an unlocking icon in response to the detected first touch, and detecting a second touch on the locking icon or the unlocking icon, wherein touching the locking icon for a predetermined time will partially unlock the mobile terminal, and wherein touching and dragging the unlocking icon to the locking icon will fully unlock the mobile terminal.

According to one feature, the first touch is performed on a button of the mobile terminal.

According to another feature, the first touch is performed on a touch screen of the mobile terminal.

According to yet another features, only functions associated with icons displayed on an initial start screen of the mobile terminal are accessible in the partially unlocked state of the mobile terminal. Additionally, all functions associated with the mobile terminal are accessible in the fully unlocked state of the mobile terminal.

According to still yet another feature, a menu icon or an information icon is displayed after detecting the second touch.

In accordance with another embodiment, a method for controlling a mobile terminal is presented. The method includes detecting a first touch on the mobile terminal for a predetermined time when the mobile terminal is in a locked state, displaying a locking icon in response to the detected first touch, detecting a second touch on the locking icon for a predetermined time, displaying an unlocking icon and a plurality of locked items in response to the second detected touch, and detecting a third touch on the unlocking icon or the locking icon, wherein the mobile terminal will fully unlock in response to the detected third touch on the unlocking icon for a predetermined time, and wherein one of the plurality of locked items will unlock in response to the detected third touch and a drag of the unlocking icon to the one of the plurality of locked items.

In accordance with yet another embodiment, a method for controlling a mobile terminal is presented. The method includes displaying a locking icon while the mobile terminal is in a locked state, detecting a first touch on the locking icon for a predetermined time, such that a plurality of locked menu items are displayed in response to the detected first touch, detecting a second touch on the locking icon, wherein one of the plurality of locked menu items will be unlocked in response to the detected second touch and a drag of the locking icon to the one of the plurality of locked menu items, and wherein the mobile terminal is unlocked if a duration of the detected second touch is greater than the predetermined time.

In accordance with still yet another embodiment, a mobile terminal is presented. The mobile terminal includes a first sensor for detecting a first touch on the mobile terminal for a predetermined time when the mobile terminal is in a locked state, a display for displaying content, and a controller for controlling the display in response to instructions from the first sensor, wherein a locking icon, an unlocking icon, and a plurality of locked items are displayed on the display in response to the detected first touch, wherein a second sensor detects a second touch on the locking icon or the unlocking icon, such that the mobile terminal will fully unlock in response to the detected second touch on the unlocking icon for a predetermined time, and one of the plurality of locked items will unlock in response to the detected second touch on the locking icon and a drag of the locking icon to the one of the plurality of locked items These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

In the following detailed description, reference is made to the accompanying figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
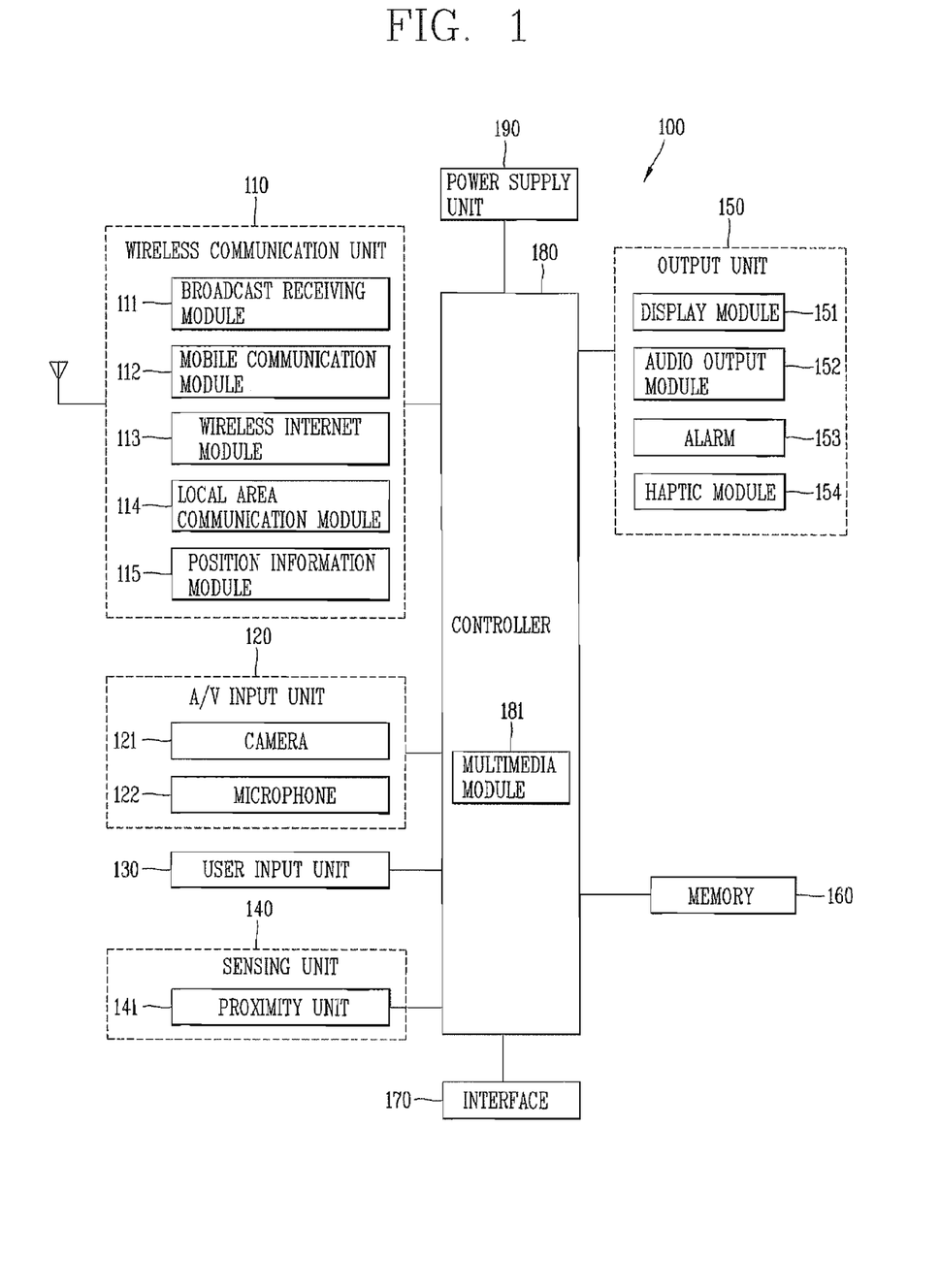
FIG. 1 is a block diagram illustrating a mobile terminal in accordance with one embodiment of the present invention.

FIG. 1 is a block diagram of a mobile terminal 100 according to an embodiment of the present invention. For example, the mobile terminal 100 includes a wireless communication unit 110, an audio/video (A/V) input unit 120, a user input unit 130, a sensing unit 140, an output unit 150, a memory 160, an interface 170, a controller 180, and a power supply 190.

The wireless communication unit 110 includes at least one module that enables radio communication between the mobile terminal 100 and a radio communication system or between the mobile terminal 100 and a network in which the mobile terminal 100 is located. For example, the wireless communication unit 110 may include a broadcast receiving module 111, a mobile communication module 112, a wireless Internet module 113, a local area communication module 114, and a position information module 115.

The broadcast receiving module 111 may receive broadcast signals and broadcast related information from an external broadcast management server through a broadcast channel. The broadcast channel may include a satellite channel and a terrestrial channel. The broadcast management server can be a server that generates and transmits broadcast signals and broadcast related information or a server that receives previously created broadcast signals and broadcast related information. The server may transmit the broadcast signals and broadcast related information to a terminal.

Further, the broadcast signals can include not only TV broadcast signals, radio broadcast signals and data broadcast signals, but also signals in the form of combination of a TV broadcast signal and a radio broadcast signal. In addition, the broadcast related information can be information on a broadcast channel, a broadcast program or a broadcast service provider. Moreover, the broadcast related information can be provided even through a mobile communication network such that the broadcast related information can be received by the mobile communication module 112.

The broadcast related information may exist in various forms. For example, the broadcast related information can exist in the form of an electronic program guide (EPG) of the digital multimedia broadcasting (DMB) system or in the form of an electronic service guide (ESG) of the digital video broadcast-handheld (DVB-H) system.

In addition, the broadcast receiving module 111 receives broadcast signals using various broadcasting systems. Particularly, the broadcast receiving module 111 can receive digital broadcast signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) systems. The broadcast receiving module 111 can also be constructed to be suited to broadcasting systems providing broadcast signals other than the above-described digital broadcasting systems.

Further, the broadcast signals and/or broadcast related information received through the broadcast receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

The wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), or high speed downlink packet access (HSDPA) can be used as a wireless Internet technique.

The local area communication module 114 corresponds to a module for local area communication. For example, BLUETOOTH®, radio frequency identification (RFID), infrared data association (IrDA), ultra wideband (UWB) or ZigBee® can be used as a local area communication technique.

The position information module 115 confirms or obtains the position of the mobile terminal 100. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also be used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display module 151.

The image frames processed by the camera 121 can be stored in the memory 160 or transmitted to an external device through the radio communication unit 110. The mobile terminal 100 can also include at least two cameras 121. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the mobile terminal 100 from a user. The user input unit 130 may include a keypad, a dome switch, a touch pad (constant voltage/capacitance), jog wheel, or jog switch.

The sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is a slide phone. Furthermore, the sensing unit 140 can sense whether the power supply 190 supplies power and whether the interface 170 is connected to an external device. The sensing unit 140 can also include a proximity sensor 141.

Referring to FIG. 1, the proximity sensor 141 of the sensing unit 140 may be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 may have a lifetime longer than that of a contact sensor, and thus, has a wide application in the mobile terminal 100.

Furthermore, the proximity sensor 141 includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, or an infrared proximity sensor. Further, a capacitive touch screen is constructed such that proximity of a pointer is detected through a variation in an electric field according to the proximity of the pointer. In this instance, the touch screen or touch sensor can be classified as a proximity sensor 141.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer makes contact.

Further, the proximity sensor 141 senses the proximity touch and a proximity touch pattern, such as a proximity touch distance, a proximity touch direction, a proximity touch velocity, a proximity touch time, a proximity touch position, or a proximity touch moving state. Information corresponding to the sensed proximity touch action and proximity touch pattern can then be displayed on the touch screen.

In addition, the output unit 150 generates visual, auditory or tactile output and includes, for example, the display module 151, an audio output module 152, an alarm 153 and a haptic module 154. The display module 151 displays information processed by the mobile terminal 100.

For example, the display module 151 displays a user interface (UI) or graphic user interface (GUI) related to a telephone call when the mobile terminal 100 is in the call mode. The display module 151 also displays a captured or/and received image, UI or GUI when the mobile terminal 100 is in the video telephony mode or the photographing mode.

In addition, the display unit 151 may include at least a liquid crystal display, a thin film transistor liquid crystal display, an organic light-emitting diode display, a flexible display or a three-dimensional display. Further, some of these displays can be of a transparent type or a light transmission type. That is, the display module 151 can include a transparent display.

In more detail, the transparent display includes a transparent liquid crystal display. Further, the rear structure of the display module 151 can also be of the light transmission type. Accordingly, a user can see an object located behind the body of the mobile terminal 100 through the transparent area of the body of the mobile terminal 100, which is occupied by the display module 151.

The mobile terminal 100 may have at least two display modules 151. For example, the mobile terminal 100 may include a plurality of displays that are arranged on a single face at a predetermined distance or integrated displays. The plurality of displays can also be arranged on different sides.

In addition, when the display module 151 and a touch sensor that senses touch form a layered structure or a touch screen, the display module 151 can be used as an input device as well as an output device. The touch sensor can be in the form of a touch film, a touch sheet and a touch pad, for example.

Further, the touch sensor can be constructed to convert a variation in pressure applied to a specific portion of the display module 151 or a variation in capacitance generated at a specific portion of the display module 151 into an electric input signal. The touch sensor can also be constructed to sense pressure of touch as well as the position and area of the touch.

When the user applies touch input to the touch sensor, a signal corresponding to the touch input is transmitted to a touch controller (not shown). The touch controller then processes the signal and transmits data corresponding to the processed signal to the controller 180. Accordingly, the controller 180 can detect a touched portion of the display module 151.

The audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions performed in the mobile terminal 100, such as a call signal incoming tone and a message incoming tone. The audio output module 152 may include a receiver, a speaker, and a buzzer.

The alarm 153 outputs a signal for indicating the generation of an event of the mobile terminal 100. For example, a signal can be generated by the alarm 153 when receiving a call signal, receiving a message, receiving a key signal, or receiving touch input. The alarm 153 can also output signals in forms different from video signals or audio signals, such as a signal for indicating generation of an event through vibration. The video signals or the audio signals can be also output through the display module 151 or the audio output module 152.

The haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects. The haptic effects include an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can transmit not only haptic effects through direct contact but also allow the user to feel haptic effects through a kinesthetic sense of the user's fingers or arms. The mobile terminal 100 may include multiple haptic modules 154.

The memory 160 can store a program for the operation of the controller 180 and temporarily store input/output data, such as phone book, messages, still images, and moving images. The memory 160 can also store data related to vibrations and sounds in various patterns, which are output when a touch input is applied to the touch screen.

Further, the memory 160 can include a flash memory, a hard disk type memory, a multimedia card micro type memory, a random access memory (RAM), a static RAM (SRAM), a read-only memory (ROM), an electrically erasable programmable ROM (EEPROM), a programmable ROM (PROM) magnetic memory, a magnetic disk, an optical disk, or a card type memory such as SD or XD memory. The mobile terminal 100 can also operate in relation to a web storage performing the storing function of the memory 160 via the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, or an earphone port, for example.

The interface 170 can also interface with a user identification module that is a chip that stores information for authenticating the authority to use the mobile terminal 100. For example, the user identification module includes a user identify module (UIM), a subscriber identify module (SIM) or a universal subscriber identify module (USIM).

An identification device including the user identification module can also be manufactured in the form of a smart card. Accordingly, the identification device may be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal 100 is correctly set in the cradle.

The controller 180 controls the overall operations of the mobile terminal 100. For example, the controller 180 performs control and processing for voice communication, data communication and video telephony. As shown in FIG. 1, the controller 180 also includes a multimedia module 181 for playing multimedia. The multimedia module 181 may be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal 100 under the control of the controller 180.

According to hardware implementation, the embodiments of the present invention can be implemented using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for executing functions. In some cases, the embodiments of the present invention may be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Various embodiments of the present invention will be explained. In the specification, a touch signal or a touch operation may include both a contact touch and a proximity touch. Further, the touch signal or the touch operation may include a point touch or a stroke including a flicking operation and a dragging operation.

Figure 2A:
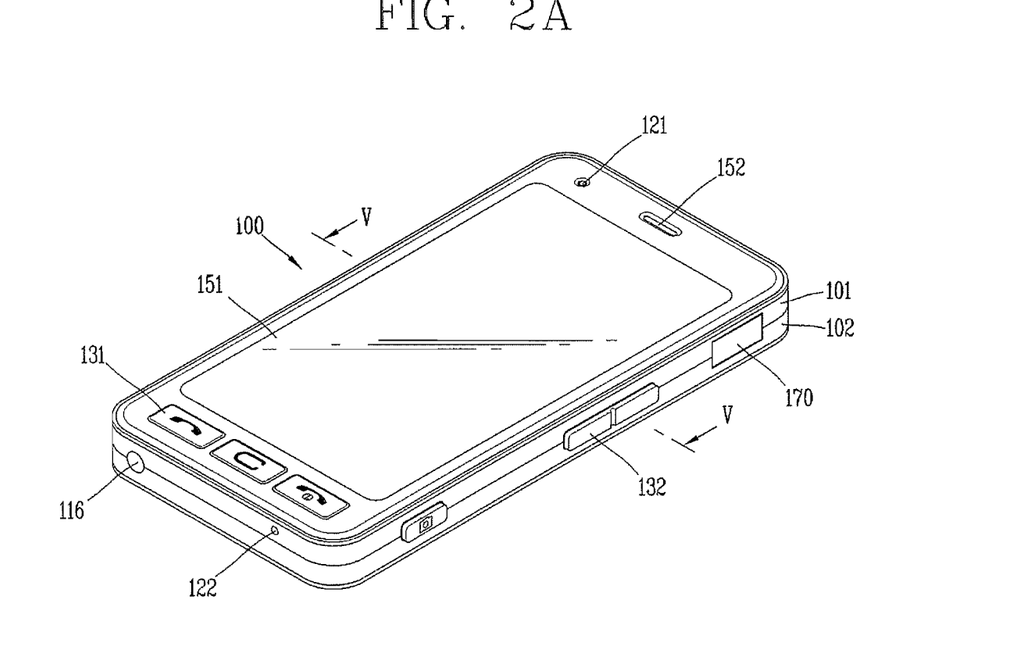
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type body. However, it should be understood that the mobile terminal 100 is not limited to a bar type body and can have a body type including at least two or more bodies that can move relative to one another, such as a slide type body, folder type body, rotational type body, swing type body, and a swivel type body.

The case of the mobile terminal 100, otherwise referred to as a "casing," "housing," or "cover," constituting the exterior of the mobile terminal 100, can include a front case 101 and a rear case 102. Various electronic components are installed in the space between the front case 101 and the rear case 102. One or more intermediate cases can be additionally disposed between the front case 101 and the rear case 102.

For example, the front case 101 and the rear case 102 can be made by injection-molding of plastics. Alternatively, the front case 101 and the rear case 102 can be made of a metallic material, such as stainless steel (STS) or titanium (Ti).

The display unit 151, the audio output module 152, the camera 121, the first user input unit 131, the second user input unit 132, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output module 152 and the camera 121 can be arranged in proximity to one end of the display unit 151, and the first user input unit 131 and the microphone 122 can be located in proximity to another end of the display unit 151. As further shown in FIG. 2A, the second user input unit 132 and the interface unit 170 are arranged on the sides of the front case 101 and the rear case 102.

The user input unit 130 described above with respect to FIG. 1 can be configured to receive commands for controlling the operation of the mobile terminal 100 and can include one or more user inputs, such as the first user input 131 and the second user input 132 shown in FIG. 2A. The first user input unit 131 and the second user input unit 132 can each be referred to as a "manipulation unit." Each manipulation unit can be configured to use various methods and techniques of tactile manipulation and response to facilitate operation by the user.

The first user input unit 131 and the second user input unit 132 can be configured to receive various inputs. For example, the first user input unit 131 can be configured to receive a start command, an end command, and a scroll command, and the second user input unit 132 can be configured to receive a volume control command for controlling the sound output from the audio output module 152, or a mode change command to change the mode of the display unit 151 to a touch recognition mode.

Figure 2B:
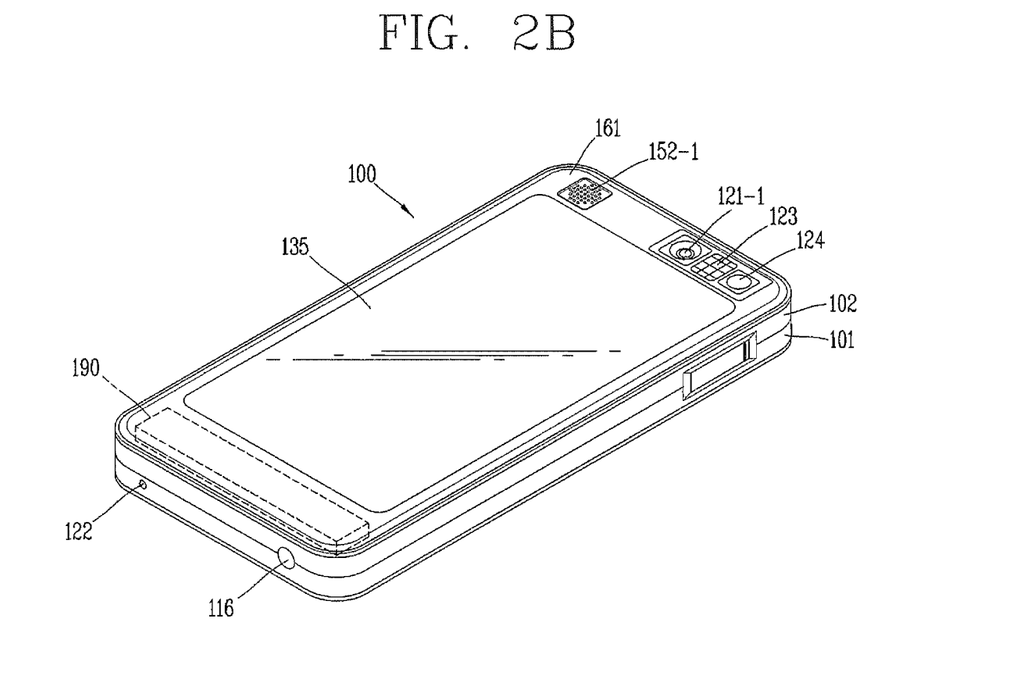
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 or other image capture device can be located on a rear surface 161 of the rear case 102. The camera 121-1 has a direction of view that is substantially opposite to the direction of view of the camera 121 shown in FIG. 2A.

For example, if the camera 121 is positioned to view the front of the mobile terminal 100, then the camera 121-1 is positioned to view the rear of the mobile terminal 100. The cameras 121 and 121-1 can have different resolutions, that is, different pixels counts, with respect to one another.

For example, the camera 121 can operate with a relatively lower resolution than the camera 121-1 in order to capture an image of the user to allow immediate transmission of the image to another user in real-time for video telephony. On the other hand the camera 121-1 can operate with a relatively higher resolution than the camera 121 to capture images of general objects with high picture quality, which may not require immediate transmission in real-time, but may be stored for later viewing or use. For example, the camera 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see herself when the user desires to capture her own image using the camera 121-1.

The rear surface 161 of the rear case 102 can further include a second audio output module 152-1. The second audio output module 152-1 can support stereophonic sound functions in conjunction with the first audio output module 152 shown in FIG. 2A and can be used for communication during a phone call when the mobile terminal 100 is in a speaker phone mode.

The broadcast receiving module 111 can include, for example, a broadcast signal receiving antenna (not shown in FIG. 1) located at one side of the mobile terminal 100, in addition to antenna 116 shown in FIGS. 2A and 2B used for mobile telephone communications. For example, the broadcast signal receiving antenna can be configured to be retractable from the mobile terminal 100.

As shown in FIG. 2B, a touch pad 135 for sensing a touch by the user can be located on the rear surface 161 of the rear case 102. In one embodiment, the touch pad 135 and the display unit 151 can be translucent. In such an embodiment, the information displayed on display unit 151 can be viewed through the touch pad 135. The information displayed on the display unit 151, which can be viewed through the touch pad 135, can be controlled by the touch pad 135. In another embodiment, a display unit in addition to display unit 151 can be located on the rear surface 161 of the rear case 102 and combined with the touch pad 135 to form the touch screen 151 on the rear case 102.

In the embodiment shown in FIGS. 2A and 2B, the touch pad 135 located on the rear case 102 can be configured to allow manipulation by the user of items displayed on the display unit 151 located on the front case 101. For example, the touch pad 135 can be positioned substantially parallel to the display unit 151.

For example, the touch pad 135 can have a size that is similar to the size of the display unit 151. In other embodiments, the touch pad 135 can have a different size relative to the display unit 151.

Hereinafter, the preferred embodiments of a control method which is implementable in the terminal constructed as mentioned above will be described with reference to the accompanying drawings. The embodiments to be explained later will be employed independently or in combination thereof. Also, the embodiments to be explained later will be used in combination with a user interface (UI).

Figure 3:
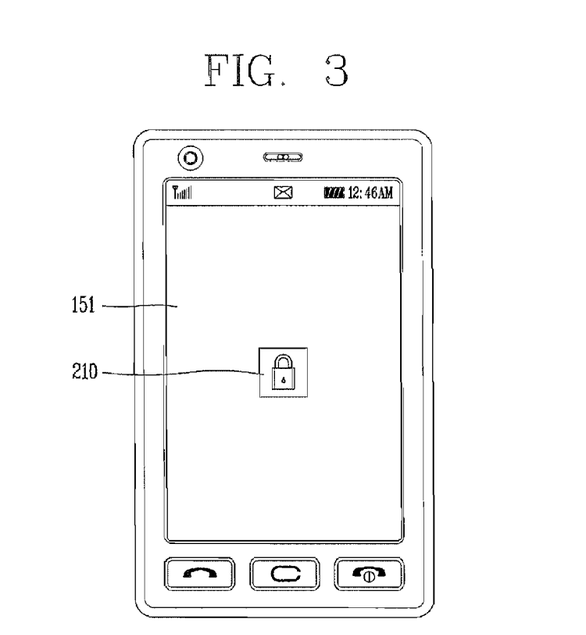
FIG. 3 is an exemplary view illustrating a locked state of a mobile terminal in accordance with one embodiment of the present invention.

FIG. 3 is an exemplary view illustrating a locked state of a mobile terminal in accordance with an embodiment of the present invention.

A locking function refers to a function for preventing an execution of a particular menu which is not intended for use by a user. The locking function of the current embodiment of the present invention differs from a locking function known in the art. The locking function known in the art is set by a user such that only the user may unlock the mobile terminal via a secret code or combination. However, a secret code or combination is not required to unlock the mobile terminal according to the current embodiment of the present invention, but rather, a controller determines if a specific operation has been executed in order to unlock the mobile terminal.

For example, as illustrated in FIG. 3, if a locking function is set, manually or automatically, in the mobile terminal, the controller 180 may display a locking icon 210 which indicates a locked state on the display 151. Alternatively, a message indicating a locked state may be displayed in lieu of the locking icon 210. The display 151 may be implemented as a touch screen. Furthermore, both a locking icon 210 and an unlocking icon may be simultaneously displayed (not shown).

The locking icon 210 may be displayed on a central portion of the screen, or a random position such as an edge portion of the screen.

Figure 4:
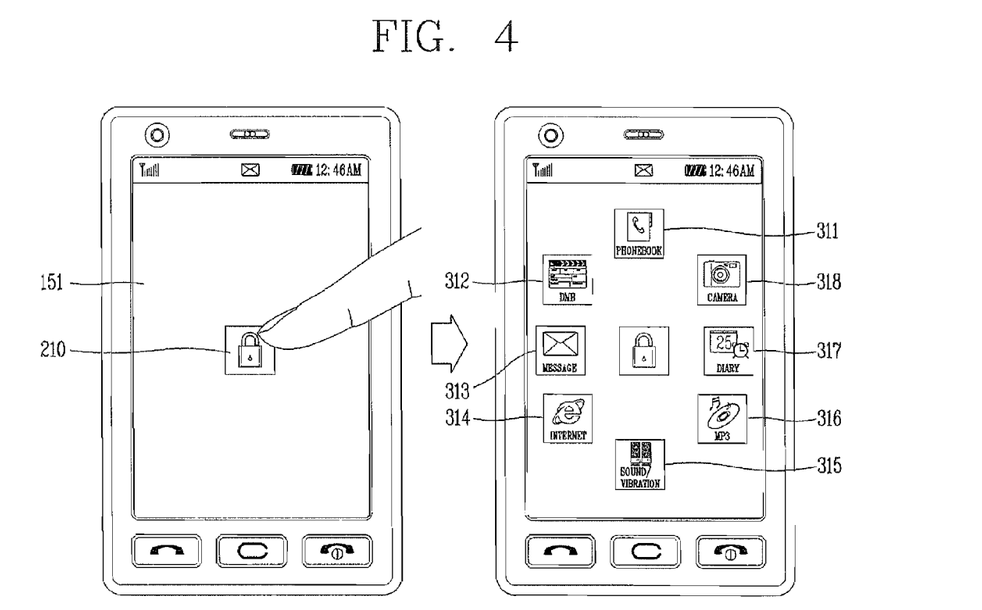
FIG. 4 is a first exemplary view illustrating a method of releasing a locked state of the mobile terminal in accordance with one embodiment of the present invention.

FIG. 4 is a exemplary view illustrating a method of releasing a locked state of the mobile terminal in accordance with the present invention.

According to one embodiment, the controller 180 may disable a backlight (not shown) of the display 151 to avoid power consumption when the mobile terminal has not received an input for a predetermined time. Additionally, the controller 180 may enable a locked state for the mobile terminal. While the backlight is disabled, the controller 180 may enable the backlight and simultaneously display the locking icon 210 on the display 151 after receiving a specific input. For example, the specific input may be a touch on a screen, or pressing a specific button on the mobile terminal.

Additionally, while the mobile terminal is in a locked state, the display 151 may only display the locking icon 210. Specifically, the display 151 may not display other menu icons, in order to prevent an execution of a function corresponding to one of the other menu icons due to inadvertent touching of one of the other menu icons.

While the locking icon 210 is displayed, the controller 180 may display preset icons 311 to 318 on the display 151 if the user touches the locking icon 210. The icons 311 to 318 may be displayed once the locking icon 210 is touched or after the locking icon 210 has been touched for a pre-determined amount of time. Furthermore, the controller may display only an unlocking icon, or both an unlocking icon and menu icons, after the locking icon 210 has been touched for a pre-determined amount of time (not shown).

The mobile terminal may be unlocked when the locking icon 210 is touched for a pre-determined time. Accordingly, an initial idle screen may be displayed when the mobile terminal enters an unlocked state. A function associated with each icon may be unlocked while displaying the icons 311 to 318.

As illustrated in FIG. 4, the icons 311 to 318 may be displayed in a specific arrangement near the locking icon 210, or displayed in a matrix (not shown). Alternatively, the icons 311 to 318 may be displayed in a preset manner selected by a user. Furthermore, the icons 311 to 318 may be displayed with an animation effect, for example the menu icons may be sequentially displayed while rotating. Specifically, the menu icons may be rotated sequentially over the locking icon 210, and when a desired menu icon overlaps the locking icon 210, a user removes the touch from the display unit 151 in order to execute a function associated with the desired menu icon. A rotating time of the menu icons 311 to 318 may be set to be less than a pre-determined time for unlocking all the locked functions of the mobile terminal.

The locking icon 210 may be continuously displayed after the icons 311 to 318 are displayed. Additionally, a size, shape, color, or display position of the locking icon 210 may be adjusted after displaying the icons 311 to 318.

The icons 311 to 318 may be a shortcut icon. At least one of the menus frequently used by a user may be set as an icon, hereinafter, referred to as a menu icon. Information icons and menu icons may be displayed on a screen. The information icons are distinct from the menu icons. Specifically, a menu is not associated with an information icon, but rather, the information icon may be associated with information such as a phonebook entry or a media file.

The functions disclosed with respect to a locking icon may be implemented in a similar manner for an unlocking icon.

Figure 5A:
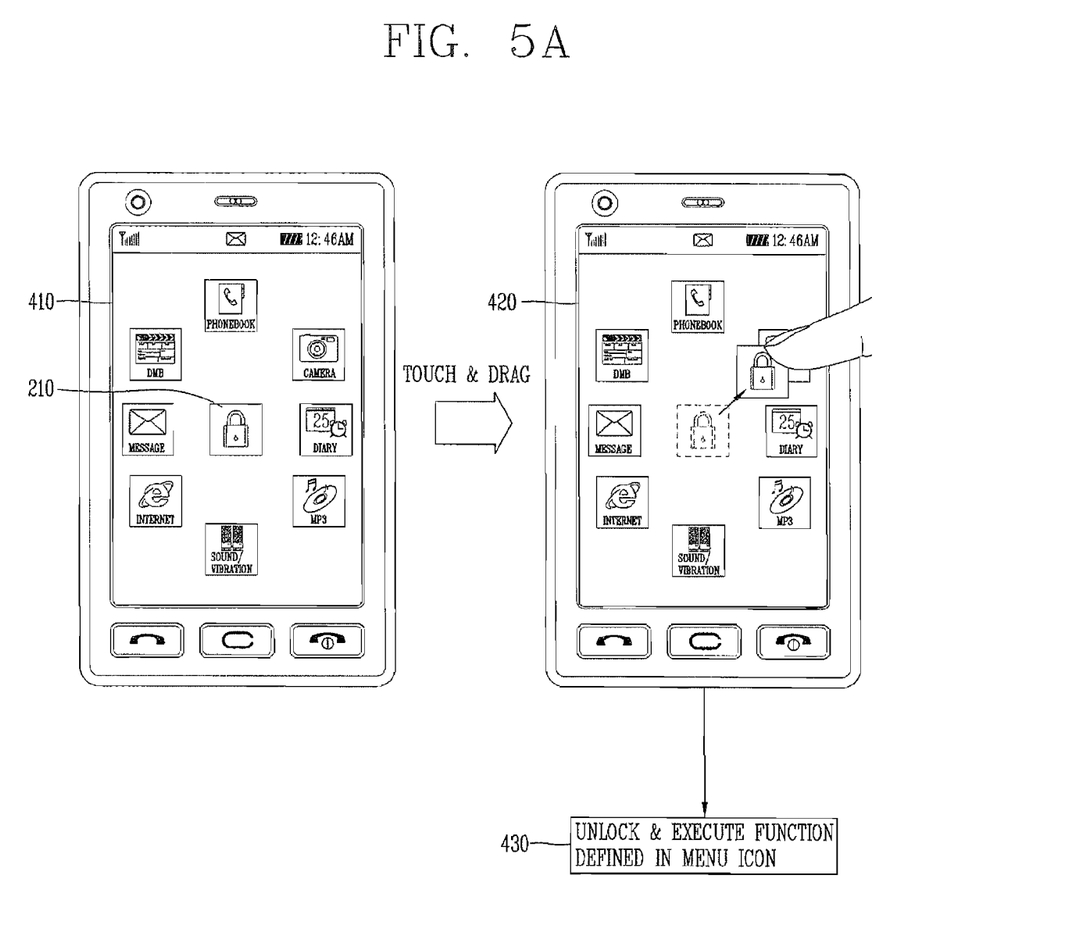
FIG. 5A is a second exemplary view illustrating a method of releasing a locked state of the mobile terminal in accordance with one embodiment of the present invention.

FIG. 5A is an exemplary view illustrating a method for releasing a locked state of the mobile terminal in accordance with the present invention.

As previously discussed, menu icons may be displayed after the locking icon 210 receives an input. Additionally, the menu icons may remain in a locked state to prevent an inadvertent execution of a function associated with the menu icon. In other words, even if a user selects a menu icon via a long touch or double touch, the selected menu icon is not executed. Accordingly, the user should select a specific menu icon for unlocking in order to execute the function associated with the selected menu item.

Hereinafter, description will be given of a method of releasing a locked state of a menu icon selected by a user. For example, as illustrated in FIG. 5A, a user may select and drag the locking icon 210 to a desired position of a screen. Thus, after selecting the locking icon 210, if the user drags the locking icon 210 toward a specific menu icon displayed on the screen 420, the controller 180 may release a locked state of the specific menu icon. Additionally, the controller 180 may immediately execute the function associated with the unlocked menu icon (430).

Figure 5B:
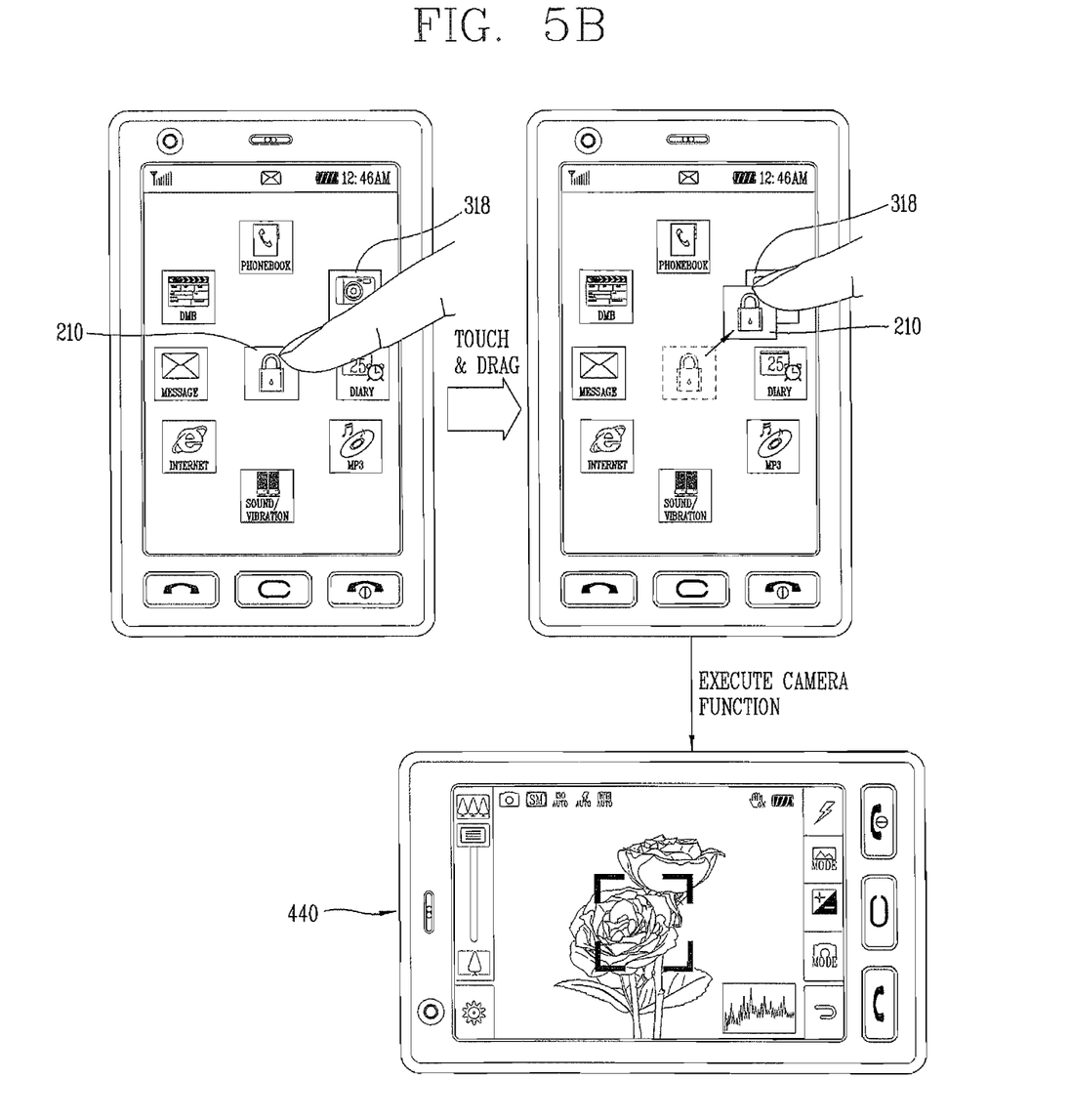
FIG. 5B is an exemplary view illustrating a screen of executing a function of a menu icon which is in a locked state in the mobile terminal in accordance with one embodiment of the present invention.

FIG. 5B is an exemplary view illustrating a screen for executing a function of a menu icon in accordance with an embodiment of the present invention.

As illustrated in FIG. 5B, the locking icon 210, menu icons or information icons located around the locking icon 210 are displayed on a screen. In this example, an environment setup option (not shown) may be executed to activate only the locking icon 210 and deactivate the menu icons.

For example, in order to execute a camera function as illustrated in FIG. 5B, a user selects and drags the locking icon 210 to a menu icon 318 defined for a camera function. The controller 180 detects the dragging of the locking icon 210. The controller 180 executes the camera function defined in the menu icon 318, and displays an execution screen of the camera function 440 on the display 151 if the locking icon 210 is dragged to the menu icon 318. In this example, the execution screen of the camera function 440 may be a preview screen for photographing an image. The example provided above is not limited to a camera function or a menu icon 318 associated with a camera function and may be implemented for any function or menu icon.

In addition to executing a function associated with a menu icon, the controller 180 may display the options or sub menus associated with the menu icon if a menu icon includes options or sub menus to be selected by the user. Hereinafter, a method for displaying the options or sub menus may be described with reference to the figures.

Figure 5C:
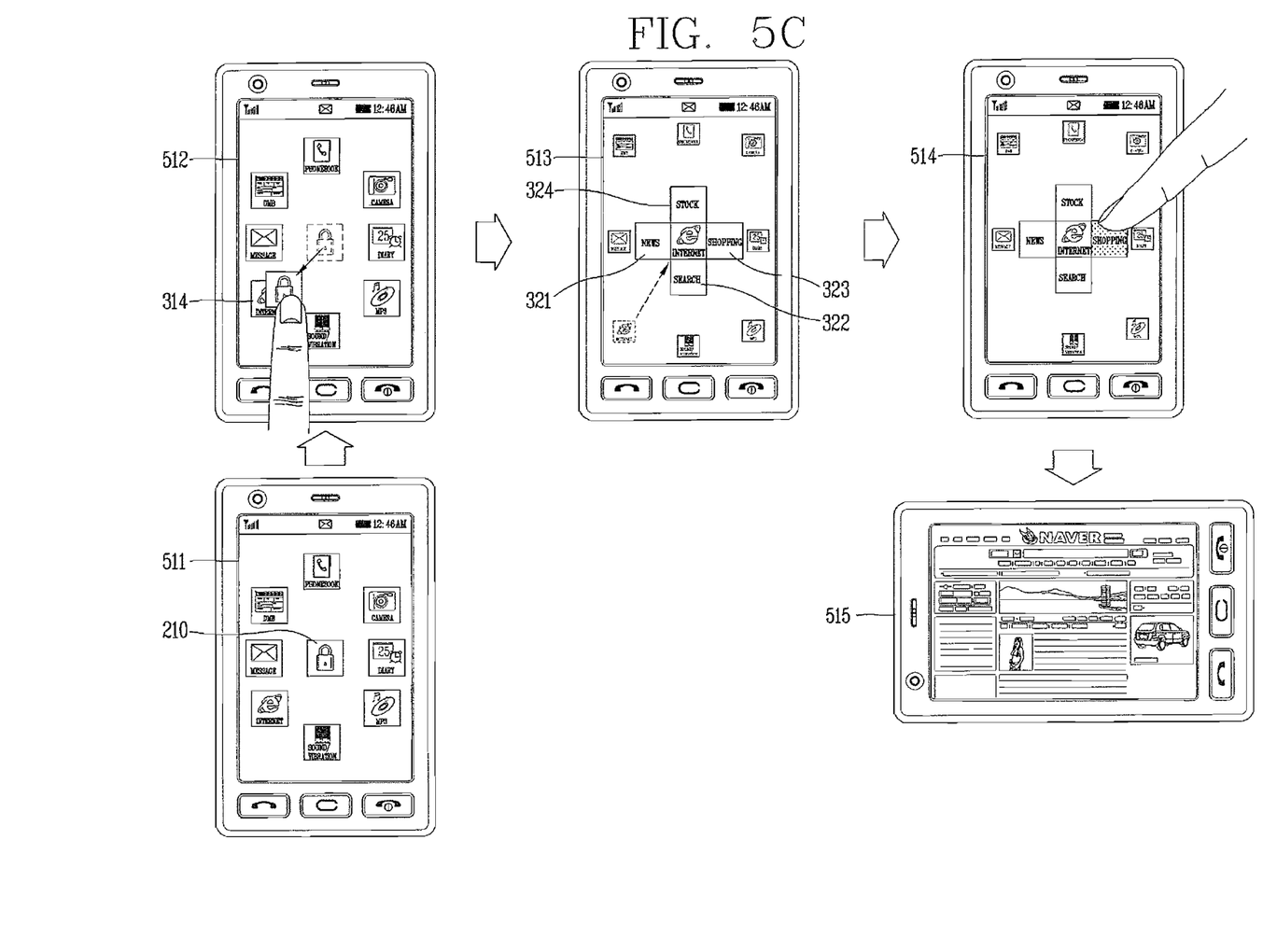
FIG. 5C is an exemplary view illustrating a screen of displaying options upon selecting a menu icon in the mobile terminal in accordance with one embodiment of the present invention.

FIG. 5C is an exemplary view illustrating a screen of displaying associated options upon selecting a menu icon in the mobile terminal in accordance with an embodiment of the present invention. As illustrated in FIG. 5C, the locking icon 210 and menu icons or information icons located around the locking icon 210 are displayed on a screen (511).

In this example, a user selects and drags the locking icon 210 toward a menu icon 314 associated with an Internet connection function. The controller 180 detects the dragging of the locking icon 210 and may execute the Internet connection function associated with the menu icon 314 if the locking icon 210 is dragged to the menu icon 314 (512). However, if the menu icon 314 includes categories, such as stock, news, shopping, or search, defined for a webpage address, the category selection options 321 to 324 may be displayed around the selected menu icon 314 (513).

The webpage addresses for each category may be edited by the user. For example, the user may touch an icon (not shown) of an address window for a pre-determined time while browsing the Internet, so as to register the current address in one of the categories associated with the menu icon. Alternatively, if a category area is touched for a pre-determined time, a screen (not shown) to edit webpage addresses defined in the category may be displayed. Finally, a menu (not shown) for editing shortcut addresses may be selected to allow the user to directly enter webpage addresses for each category.

A connection with a website associated with a selected category is established (515) after selecting a specific category, such as shopping 323 (514). If a web connection is established without a selection of a category, a web-browser may be connected to a default address.

Figure 5D:
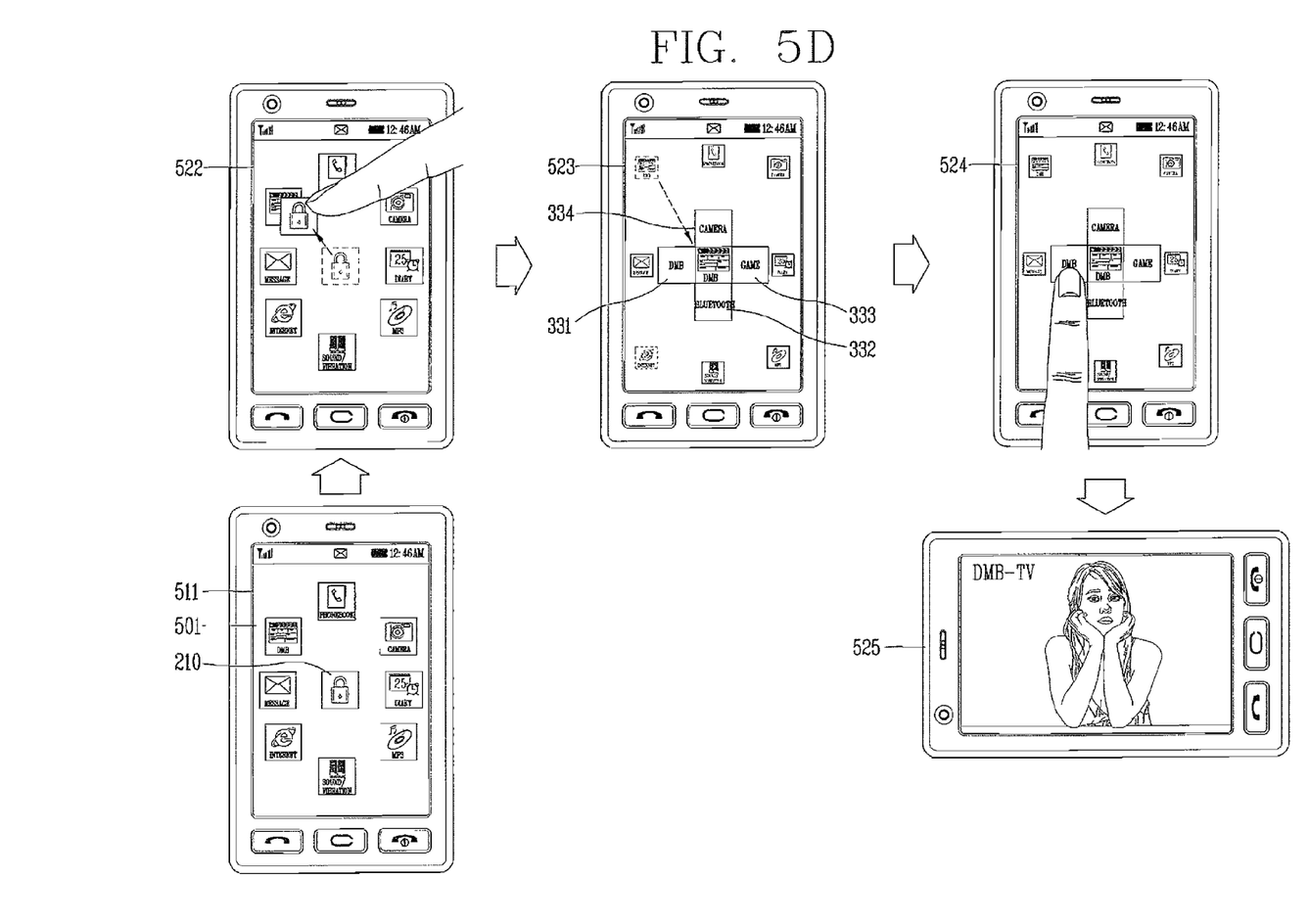
FIG. 5D is an exemplary view illustrating a screen of displaying detailed menus upon selecting a menu icon in the mobile terminal in accordance with one embodiment of the present invention.

FIG. 5D is an exemplary view illustrating a screen of displaying detailed menus upon selecting a menu icon in the mobile terminal in accordance with an embodiment of the present invention. As illustrated in FIG. 5D, the locking icon 210 and menu icons or information icons located around the locking icon 210 are displayed on a screen (521).

In this example a user selects and drags the locking icon 210 toward a menu icon 501 associated with a multimedia menu. The multimedia menu is not associated with an executable function, but rather, the multimedia menu is associated with various menus. Thus, when the locking icon 210 is dragged to the menu icon 501 (522), the controller 180 may display sub menus 331 to 334 (523). For example, the multimedia menu icon includes sub menus, such as digital multimedia broadcast (DMB) 331, Bluetooth 332, game 333, and camera 334. The sub menus may also be set in place of the multimedia icon so as to be directly executable.

A user may select a sub menu and the controller 180 may execute a function associated with the selected menu (525) upon selection of one of the sub menus (524) such as the DMB sub menu 331.

In order to ensure enough space for displaying the selection options or the sub menus, the controller 180 may change a size or display position of the non-selected menu icons. For example, the menu icons may be reduced in size and displayed near the edges of the screen.

Although not shown, the user may drag a desired menu icon to the locking icon 210 located on the screen in order to disable the locked state of the menu icon and execute a function associated with the menu icon.

Figure 6:
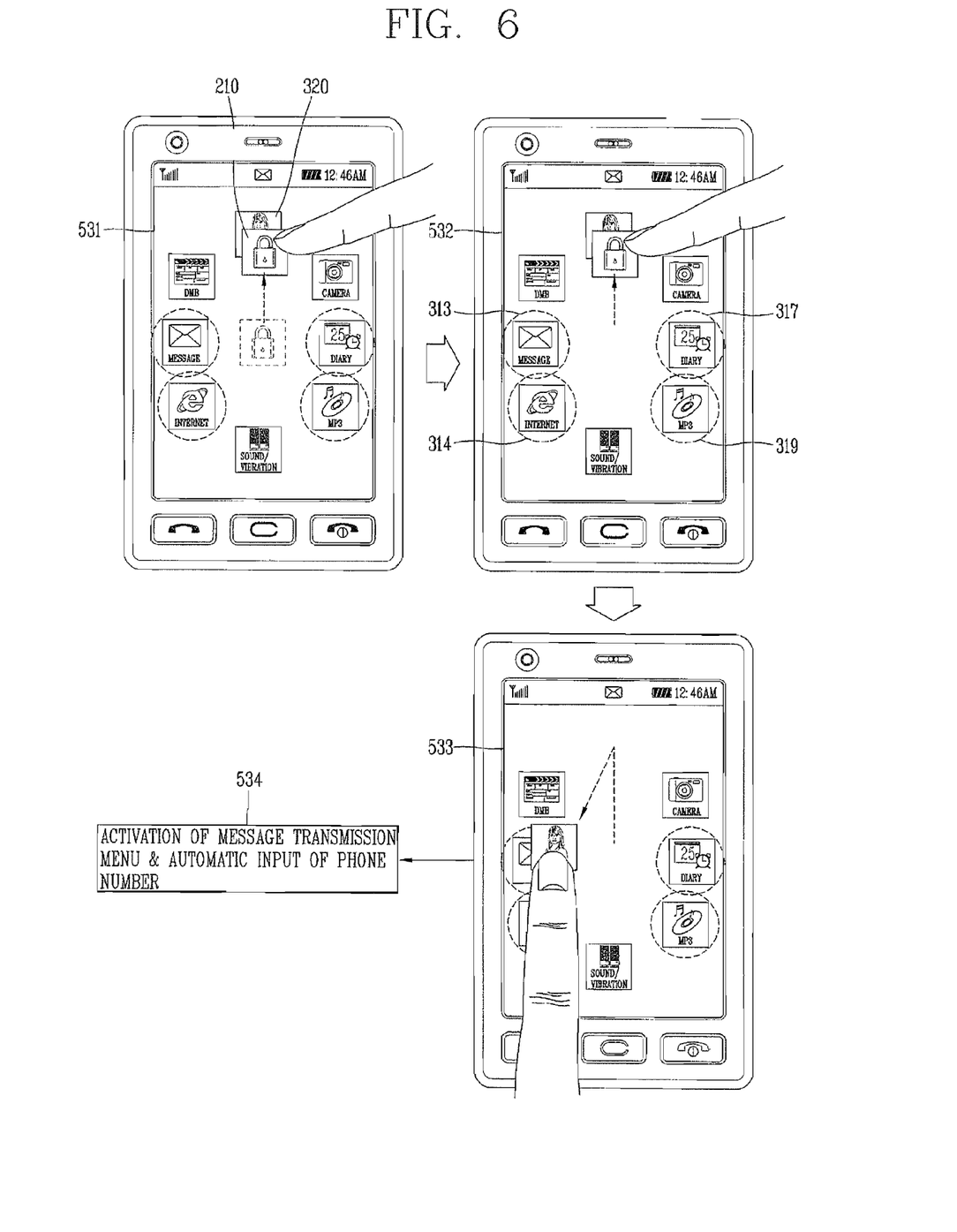
FIG. 6 is an exemplary view illustrating a method for executing a function relating to an information icon in the mobile terminal in accordance with one embodiment of the present invention.

FIG. 6 illustrates a method for executing a function relating to an information icon in the mobile terminal in accordance with one embodiment of the present invention.

While in a locked state, functions associated with information icons cannot be executed, similar to the menu icons, the mobile terminal must be unlocked in order to execute functions associated with the information icons.

In order to disable a locked state of an information icon, the locking icon 210 may be dragged to an information icon 320. Accordingly, the controller 180 may disable a locked state of the information icon 320, and thereby activate the information icon 320.

The locking icon 210 may overlap the information icon 320. Accordingly, the locking icon 210 and the information icon 320 may be simultaneously dragged even if a user only drags the locking icon 210 to one of the menu icons 313, 314, 317, and 319. Alternatively, the locking icon 210 may remain overlapped with the information icon 320 regardless of whether a touch or selection is maintained on the locking icon 210, and consequently, while the locking icon 210 overlaps the information icon 320, the locking icon 210 and the information icon 320 may be simultaneously dragged to one of the menu icons, such that a function associated with the menu icon may be executed.

According to another embodiment, the locking icon 210 may alter a characteristic after performing a drag operation to disable a locked state. Specifically, the locking icon 210 may change at least one of color, shadow, size, shape, or display position. Additionally, in order to indicate the unlocked state of an information icon, at least one of color, shadow, size, shape, or display position of the information icon may be changed or an indicator for informing the unlocked state of the information icon may be displayed on the information icon.

Upon unlocking the information icon 320, the controller 180 may highlight the menu icons 313, 314, 317 and 319 associated with the information icon 320 (532). Specifically, the controller 180 may change at least one of a size, color, shape or display position of menu icons associated with the information icon 320. For example, if the information icon is associated with an audio file, a multimedia menu icon, such as a music player icon, may be highlighted. As another example, if the information is associated with an image file, a multimedia menu icon, such as a photo album menu icon may be highlighted.

As illustrated in FIG. 6, if the information icon 320 is associated with a phonebook entry, menu icons, such as message, Internet, diary, or call, may be highlighted (532). The menu icons associated with the phonebook entry may be determined according to information registered in the phonebook. For example, if information, such as phone number, homepage address, schedule, or e-mail address, are registered in the phonebook, the menu icons may be highlighted. Accordingly, if the homepage address of the phonebook entry is not registered in the phonebook, an Internet menu icon may not be highlighted.

Therefore, the user can drag the information icon 320 overlapped with the locking icon 210 or an information icon 320 with an altered state to one of the highlighted menu icons. For example, if the user drags the information icon 320 to the Internet menu icon, the controller 180 may execute a web browser to access the webpage associated with the information icon 320. Additionally, if the user drags the information icon 320 to a message menu icon (533), the controller 180 may display an execution screen for transmitting a message to allow an input of a phone number (544).

As discussed above, after unlocking the information icon, the information icon may be dragged to a corresponding menu icon if a corresponding function of a menu icon associated with the information icon is desired to be executed. Alternatively, after unlocking the information icon, the user may drag the locking icon to the menu icon and then drag the menu icon to a desired information icon. Accordingly, different functions may be performed depending on which icon was first to be touched and dragged.

For example, an SMS message list associated with the information icon may be displayed, if the locking icon is dragged to an SMS message icon and then the SMS message icon is dragged to an information icon while maintaining the original touch. In another example, a screen for writing a message to be sent to a party may be displayed if the locking icon is dragged to the information icon and then the unlocked information icon is dragged to the SMS message icon while maintaining the touch.

Alternatively, after dragging the locking icon to the information icon, even if the touch is not maintained, the information icon may be dragged to a desired menu icon if the information icon is touched again within a preset time. If the information icon is not touched within the preset time, the controller 180 may lock the mobile terminal again.

Figure 7:
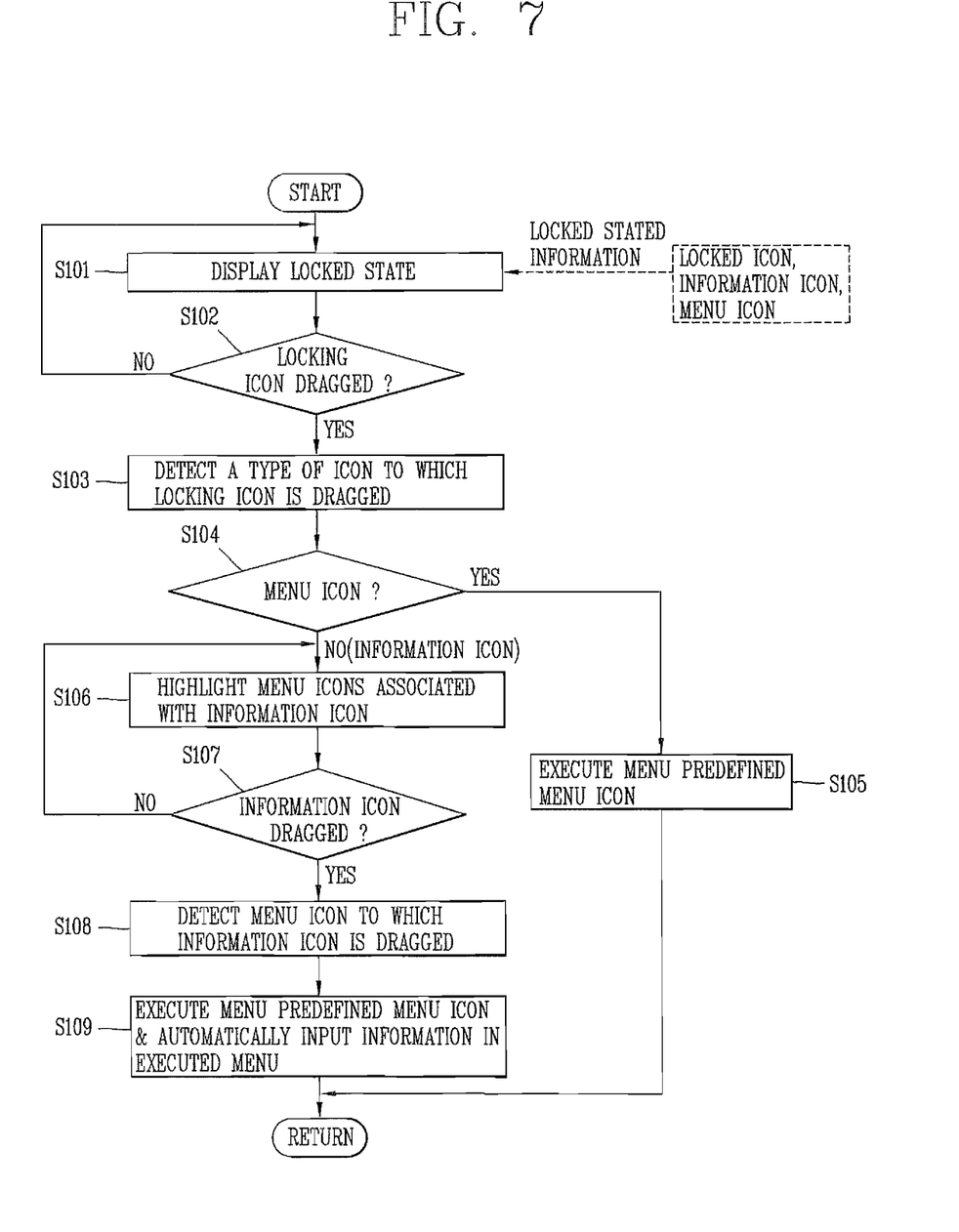
FIG. 7 is a flowchart illustrating a method of releasing a locked state of the mobile terminal in accordance with one embodiment of the present invention.

FIG. 7 is a flowchart illustrating a method of releasing a locked state of the mobile terminal in accordance with an embodiment of the present invention. Description of FIG. 7 will be given under assumption that the mobile terminal is in a locked state.

The mobile terminal in the locked state displays and indication of its locked state on the display 151 (S101). For example, the controller 180 may display a locking icon at one side of the screen, and may additionally display preset menu icons or information icons. The menu icons and information icons may be referred to as items, such as menu items or information items, or objects, such as menu objects or information objects. The menu icons or information icons may be displayed simultaneously with the locking icon or displayed only when the locking icon is touched, depending on environment setup options set in the mobile terminal.

When the locking icon, the menu icons, and information icons are displayed on the display 151, the controller 180 may detect the dragged route of the locking icon via the sensing unit 140 when a user touches the locking icon and drags the icon to a specific desired icon.

If the user drags the locking icon to a specific icon (S102), the controller 180 releases a locked state of a function associated with the specific icon and simultaneously detects a type of the specific icon (S103). In other words, the controller 180 may detect whether the specific icon is a menu icon or an information icon.

If the detected specific icon is a menu icon (S104), the controller 180 executes a function defined in the menu icon, and displays an execution screen thereof (S105). Additionally, if the specific icon includes options or sub menus to be selected by a user, such options or sub menus may be displayed.

If the detected specific icon is an information icon, the controller 180 highlights menu icons associated with the information icon (S106). The user may drag the information icon to one of the highlighted menu icons (S107). Specifically, after dragging the locking icon to the information icon, the user may keep dragging the information icon to a desired menu icon, or the user may retouch the information icon within a preset time after the previous touch is released and drag the information icon to the desired menu icon.

Accordingly, the controller 180 detects the menu icon to which the information icon has been dragged (S108) if the information icon is dragged. The controller 180 then executes the menu icon and thereafter automatically inputs information corresponding to the information icon to the executed menu (S109). For example, if the menu is a message transmission menu and the information is a phone number, the phone number is automatically input. In another example, if the menu is a music playback menu and the information is an audio file, the audio file is automatically played.

As such, regarding the menu which was executed by dragging the locking icon to the specific menu icon or information icon, the menu may return to a locked state when the execution of the menu is completed, such as when a phone call is terminated, the playback of music is completed, or photographing/image-storing is completed, alternatively, the user may manually input a stop command, such as pressing a stop button.

As previously discussed, while in a locked state, the menu icons or information icons may be simultaneously displayed with the locking icon, or alternatively, only displayed when the locking icon is touched.

When the locking icon is displayed together with the menu icons or information icons, if a user touches the locking icon to drag to an information icon, the controller 180 may highlight menu icons associated with the information icon.

Accordingly, the user drags the information icon to one of the activated menu icons and executes a specific function associated with the menu icon. The controller 180 may re-set the mobile terminal to the locked state after a specific function is executed.

Furthermore, the user may want to execute a function which differs from the previously executed specific function, still, the mobile terminal may have reverted to a locked state. The locking icon and various menu icons may still be displayed on a screen if the mobile terminal has reverted to the locked state. In this example, the displayed menu icons may be menu icons of applications which are executable with the specific function. Specifically, menu icons which are available for multitasking together with the currently-executed specific function may be displayed in an activated state.

As such, while in the locked state, the user may select one of the displayed menu icons in the activated state, such that the user may execute a plurality of applications. In other words, the user may execute a plurality of desired applications in the locked state.

Furthermore, the controller 180 may reset the mobile terminal to the locked state after executing a function associated with a menu. Additionally, the mobile terminal may automatically reset to the locked state if a preset time elapses after executing the specific menu. Also, the mobile terminal may be automatically locked or unlocked if the user presses a specific button provided for a predetermined time or presses a specific screen region for a predetermined time. Furthermore, the locked state may be automatically released if the user touches and drags the screen with a predetermined motion.

The above embodiment has illustrated locking of entire functions of the mobile terminal. However, as another embodiment, only specific information icons or a specific menu icon defined by the user may be selectively locked.

For example, after displaying a locking icon or unlocking icon, an information icon or menu icon may be dragged to the locking icon so as to be locked. Alternatively, an information icon or menu icon in a locked state may be unlocked by being dragged to the unlocking icon. The information in the locked state may not be accessed until being unlocked. Here, the locking icon indicates an icon having a function of locking the information icon or menu icon, and the unlocking icon indicates an icon having a function of unlocking the information icon or menu icon.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a mobile terminal, the method comprising:
   displaying, on a touchscreen, a locking icon;
   displaying, on the touchscreen, a plurality of application icons in response to a touch input received with regard to the locking icon, wherein the plurality of application icons are not displayed until after the touch input is received, wherein each of the displayed plurality of application icons is in a locked state, and wherein each of the plurality of application icons is associated with an application executable at the mobile terminal;
   changing displayed appearance of the locking icon;
   changing a displayed location of the changed appearance locking icon corresponding to a drag input, wherein the drag input is a touch that occurs over a distance that extends from the touch input, and wherein the displayed location of the changed appearance locking icon generally corresponds to the location of the touchscreen at which the drag input is currently received, and wherein change in location at which the drag input is currently received causes a corresponding change in the displayed location of the changed appearance locking icon;
   executing the application of a selected icon of the plurality of application icons, wherein the selected icon is selected according to an ending location of the drag input occurring proximate to the selected icon, and
   wherein after receiving the drag input, only the state of the selected icon is unlocked to permit the executing of the application of the selected icon, while remaining icons of the plurality of application icons remain in the locked state.

2. The method of claim 1, wherein the locking icon is displayed in response to pressure applied to a button of the mobile terminal.

3. The method of claim 1, wherein each of the plurality of application icons remain in the locked state until the drag input is released.

4. The method of claim 1, wherein the plurality of application icons are displayed around the displayed locking icon.

5. The method of claim 1, wherein the changed appearance locking icon moves along a drag path of the drag input.

6. The method of claim 5, wherein the changed appearance locking icon at least partially overlaps the selected icon when the changed appearance locking icon is dragged to the selected icon.

7. The method of claim 1, further comprising displaying an unlocking icon simultaneously with the displaying of the plurality of application icons and the changed appearance locking icon.

8. The method of claim 1, wherein the selected icon is highlighted after the selecting according to the drag input being received proximate to the selected icon.

9. The method of claim 1, wherein each of the plurality of application icons is a shortcut to its associated application.

10. The method of claim 1, further comprising:
    providing haptic feedback responsive to the selecting according to the drag input being received proximate to the selected icon.

11. The method of claim 1, wherein the locking icon comprises a shape of a lock.

12. A mobile terminal, comprising:
    a touchscreen; and
    a controller operatively coupled to the touchscreen, wherein the controller is configured to:
      cause displaying on the touchscreen, a locking icon;
      cause displaying on the touchscreen, a plurality of application icons in response to a touch input received with regard to the locking icon, wherein the plurality of application icons are not displayed until after the touch input is received, wherein each of the displayed plurality of application icons is in a locked state, and wherein each of the plurality of application icons is associated with an application executable at the mobile terminal;
      cause a change of displayed appearance of the locking icon;
      cause a change of a displayed location of the changed appearance locking icon corresponding to a drag input, wherein the drag input is a touch that occurs over a distance that extends from the touch input, and wherein the displayed location of the changed appearance locking icon generally corresponds to the location of the touchscreen at which the drag input is currently received, and wherein change in location at which the drag input is currently received causes a corresponding change in the displayed location of the changed appearance locking icon;
      execute the application of a selected icon of the plurality of application icons, wherein the selected icon is selected according to an ending location of the drag input occurring proximate to the selected icon; and
      wherein after receiving the drag input, only the state of the selected icon is unlocked to permit the executing of the application of the selected icon, while remaining icons of the plurality of application icons remain in the locked state.

13. The mobile terminal of claim 12, wherein the locking icon is displayed in response to pressure applied to a button of the mobile terminal.

14. The mobile terminal of claim 12, wherein each of the plurality of application icons remain in the locked state until the drag input is released.

15. The mobile terminal of claim 12, wherein the plurality of application icons are displayed around the displayed locking icon.

16. The mobile terminal of claim 12, wherein the changed appearance locking icon moves along a drag path of the drag input.

17. The mobile terminal of claim 16, wherein the changed appearance locking icon at least partially overlaps the selected icon when the changed appearance locking icon is dragged to the selected icon.

18. The mobile terminal of claim 12, wherein the controller is further configured to:
    cause the touchscreen to display an unlocking icon simultaneously with the displaying of the plurality of application icons and the changed appearance locking icon.

19. The mobile terminal of claim 12, wherein the selected icon is highlighted after the selecting according to the drag input being received proximate to the selected icon.

20. The mobile terminal of claim 12, wherein each of the plurality of application icons is a shortcut to its associated application.

21. The mobile terminal of claim 12, wherein the controller is further configured to:
    cause providing of haptic feedback responsive to the selecting according to the drag input being received proximate to the selected icon.

22. The mobile terminal of claim 12, wherein the locking icon comprises a shape of a lock.

\* \* \* \* \*